United States Patent [19]
Kallenbach et al.

[11] Patent Number: 5,352,395
[45] Date of Patent: Oct. 4, 1994

[54] CARBON AND CERAMIC-CONTAINING LAYERS FOR USE IN SINTERING OF SILICON NITRIDE ARTICLE

[75] Inventors: Lyle R. Kallenbach; Bruce W. Gerhold, both of Bartlesville, Okla.

[73] Assignee: Phillips Petroleum Company, Bartlesville, Okla.

[21] Appl. No.: 916,318

[22] Filed: Jul. 17, 1992

[51] Int. Cl.$^5$ ............................................. C04B 35/58
[52] U.S. Cl. ....................................... 264/62; 264/64; 264/65
[58] Field of Search ............................. 264/65, 62, 64

[56] References Cited

U.S. PATENT DOCUMENTS

| | | | |
|---|---|---|---|
| 3,950,464 | 4/1976 | Masaki | 264/65 |
| 3,953,221 | 4/1976 | Lange | 106/62 |
| 3,992,497 | 11/1976 | Terwilliger et al. | 264/56 |
| 4,209,478 | 6/1980 | Wooten | 264/65 |
| 4,377,542 | 3/1983 | Mangels | 264/65 |
| 4,379,110 | 4/1983 | Greskovich et al. | 264/65 |
| 4,383,958 | 5/1983 | Moschetti | 264/65 |
| 4,414,190 | 11/1983 | Seimiya et al. | 423/344 |
| 4,485,182 | 11/1984 | Enomoto et al. | 501/151 |
| 4,506,021 | 3/1985 | Jack et al. | 501/98 |
| 4,511,402 | 4/1985 | Miura et al. | 75/233 |
| 4,603,116 | 7/1986 | Smith et al. | 501/97 |
| 4,612,146 | 9/1986 | Huther | 264/62 |
| 4,622,186 | 11/1986 | Mizutani | 264/62 |
| 4,640,711 | 2/1987 | Lichti | 264/65 |
| 4,647,414 | 3/1987 | Mizuno | 264/62 |
| 4,690,909 | 9/1987 | Okuno et al. | 501/90 |
| 4,701,426 | 10/1987 | Okuno et al. | 501/90 |
| 4,837,231 | 6/1989 | Endo et al. | 501/91 |
| 5,176,893 | 1/1993 | Gerhold et al. | 423/344 |
| 5,178,844 | 1/1993 | Carter et al. | 423/290 |

FOREIGN PATENT DOCUMENTS

| | | |
|---|---|---|
| 0082370 | 6/1983 | European Pat. Off. . |
| 0425825 | 5/1991 | European Pat. Off. . |
| 0450562 | 10/1991 | European Pat. Off. . |
| 2160672 | 6/1990 | Japan . |
| 4059660 | 2/1992 | Japan . |
| 2010913 | 7/1979 | United Kingdom . |

OTHER PUBLICATIONS

Hayashi et al., "Pressureless Sintering of $Si_3N_4$ with $Y_2O_3$ and $Al_2O_3$", *Journal of Materials Science* 21 (1986), pp. 3501–3508.

Futaki et al., "The Sinterability of Ultrafine $Si_3N_4$", *Journal of Materials Science* 22 (1987), pp. 4331–4335.

Ube Advanced Ceramic Materials Technical Report, "Conditions of Pressureless Sintering", Ube Industries, Ltd., Tokyo, Japan, 1987.

*Primary Examiner*—James Derrington
*Attorney, Agent, or Firm*—J. E. Phillips

[57] ABSTRACT

Sintering of an article molded from a first particulate material comprising silicon nitride employs carbon and ceramic-containing layers. At least one outer layer comprising a second particulate material is positioned with respect to the article so as to be closely adjacent to but not contacting the article, and at least one inner layer comprising a third particulate material is intermediate to the outer layer and the article so as to at least partially surround the article. The second particulate material comprises at least about 90 weight percent carbon, and the third particulate material comprises a ceramic compound selected from a nitride, a carbide, and mixtures thereof. The article is heated while positioned with respect to the outer and inner layers as described above so as to result in a sintered article.

25 Claims, 1 Drawing Sheet

«5,352,395»

CARBON AND CERAMIC-CONTAINING LAYERS FOR USE IN SINTERING OF SILICON NITRIDE ARTICLE

BACKGROUND OF THE INVENTION

According to one aspect of the invention, this invention relates to sintering of a silicon nitride article by employing at least one carbon-containing layer closely adjacent to the article and at least one ceramic-containing layer intermediate to the article and carbon-containing layer. According to another aspect, the invention relates to the combination of such layers and the silicon nitride article.

Heretofore, difficulties are many times encountered in the sintering of silicon nitride articles at lower pressures of, for example, less than 200 psig, and particularly at pressures near atmospheric pressure. The primary difficulty is in obtaining an acceptably high density of at least and preferably more than 90 percent of the theoretical density of silicon nitride. It is particularly advantageous to sinter at the above-described pressures rather than at higher pressures to avoid use of complex and expensive equipment associated with operation at high pressures.

SUMMARY OF THE INVENTION

It is, therefore, an object of the invention to provide a method for sintering silicon nitride articles which will successfully sinter such articles to a density of at least about 90 percent of theoretical density by employing a pressure of less than 200 psig, and more preferably a pressure near atmospheric pressure.

The above object is realized by a method comprising:
(a) providing an article molded from a first particulate material comprising silicon nitride;
(b) providing at least one outer layer which is closely adjacent to but not contacting the article and which comprises a second particulate material comprising at least about 90 weight percent carbon;
(c) providing at least one inner layer which at partially surrounds the article so as to be intermediate to the article and the outer layer(s) and which comprises a third particulate material comprising a ceramic compound selected from the group consisting of a nitride, a carbide, and mixtures thereof; and
(d) heating the article as positioned with respect to the outer and inner layer(s) in steps (b) and (c) so as to sinter the article.

According to another aspect of the invention, there is provided a combination of the article, at least one outer layer, and at least one inner layer, as described above.

Sintering an article comprising silicon nitride in accordance with the invention by employing the above-described inner and outer layers enables sintering of the article to densities in excess of 90 percent of theoretical density of silicon nitride with pressures less than 200 psig, and most preferably at pressures in the range of about 0 psig to about 15 psig. As discussed previously, sintering at such low pressures enables the use of simple and inexpensive equipment.

BRIEF DESCRIPTION OF THE INVENTION

FIG. 1 is a diagrammatic cross-sectional view of a furnace having a crucible therein which contains an article packed in inner and outer layers in accordance with the invention.

DETAILED DESCRIPTION OF THE INVENTION

Figure 1:
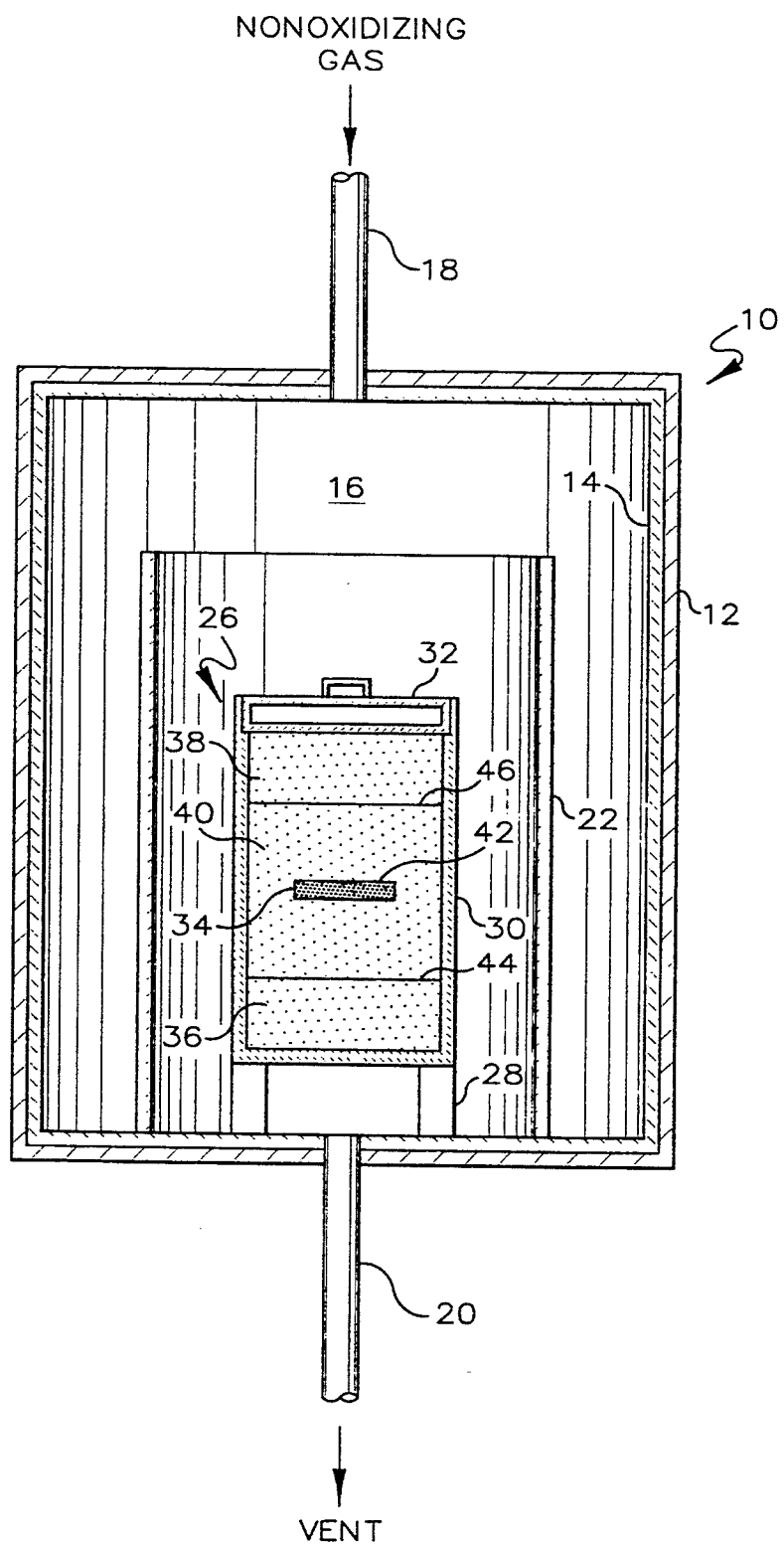

An embodiment of the invention will now be described with reference to the FIGURE.

With respect to terminology, the term "particulate" as used herein and in the appended claims and as applied to a material means that the material is in the form of particles, wherein the term "particles" are defined simply as discrete units of material structure. The terms "particulate" and "particles" do not in themselves imply any particular shape or size.

The furnace as diagrammatically illustrated in FIG. 1 includes a housing 10 having an outer metal shell 12 and an inner refractory, preferably graphite, lining 14 which defines a heating chamber 16 therein; an inlet conduit 18 communicating with heating chamber 16; an outlet conduit 20 also communicating with heating chamber 16; and an electrically conductive, preferably graphite, tubular electrode 22 positioned within heating chamber 16 for generating heat within heating chamber 16 by means of electrical power supplied to such electrode by a suitable power supply and control (not shown). Of course, any other design of furnace is within the scope of the invention providing that it operates to heat an article contained therein so as to sinter the article as is further described below.

Positioned within electrode 22 and in heating chamber 16 is a refractory, preferably graphite, crucible 26 which in the illustrated embodiment includes supporting legs 28 (only two of which are shown), main body portion 30 for containing the various layers and article therein in accordance with the invention, and a loose-fitting lid 32 which sets on top of the main body portion 30. Of course, any design of crucible is within the scope of the invention as long as it will tolerate the sintering temperatures and effectively contain the various layers and article in accordance with the invention.

Contained within main body portion 30 of crucible 26 are an article 34 molded from a first particulate material, outer layers 36 and 38 which comprise a second particulate material and which are closely adjacent to but not contacting article 34, and a single inner layer 40 which comprises a third particulate material and which in the illustrated embodiment completely surrounds article 34 so as to intermediate to article 34 and outer layers 36 and 38. As shown, inner layer 40 has an inner boundary which contacts the exterior surface of article 34 as indicated at 42, and further has outer boundaries which contact respective inner boundaries of layers 36 and 38 as indicated at 44 and 46. Of the total volume of layers 36, 38, and 40, inner layer 40 preferably comprises about 10 to about 90 volume percent and the combined volume of outer layers 36 and 38 also preferably comprises about 10 to about 90 volume percent. In addition, the ratio of the volume of inner layer 40 to the volume of article 34 as well as the ratio of the combined volume of outer layers 36 and 38 to the volume of article 34 is preferably about 1:1 to about 100:1, most preferably about 5:1 to about 50:1.

In filling crucible 26 with the particulate materials of layers 36, 38, and 40, it is generally not desirable to tightly pack such particulate materials within crucible 26. Instead, any packing of such particulate materials should be limited to gentle tapping of crucible 26 after it has been filled.

Article 34 is molded from the first particulate material which comprises silicon nitride. The invention is particularly applicable to a first particulate material which is described as a "raw product powder" in U.S. Pat. Nos. 5,176,893, issued Jan. 5, 1993, and 5,178,844, issued Jan. 12, 1993, both of which patents are herein incorporated by reference. Such raw product powder is produced directly from the reactor as described in such applications and comprises silicon in addition to that in the silicon nitride, carbon, and oxygen, and is further characterized by the following weight percentages: silicon in the amount of about 40 to about 75 weight percent, preferably in the amount of about 50 to about 70 weight percent, and most preferably in the amount of about 55 to about 65 weight percent; nitrogen in the amount of about 10 to about 40 weight percent, preferably in the amount of about 15 to about 35 weight percent, and most preferably in the amount of about 25 to about 35 weight percent; carbon in the amount of about 1 to about 10 weight percent, preferably in the amount of about 1 to about 6 weight percent, and most preferably in the amount of about 1 to about 3 weight percent; and oxygen in the amount of about 1 to about 30 weight percent, preferably in the amount of about 1 to about 20 weight percent, and most preferably in the amount of about 1 to about 15 weight percent. Hydrogen can also be present in the raw product powder in minor but detectable amounts of between 0 and about 1 weight percent. Individual particles of the raw product powder are highly uniform and have diameters which range from about 0.01 to about 0.5 micron.

As mentioned above, article 34 is molded from the first particulate material. A preferred procedure for molding of article 34 before placement in crucible 26 is as follows. In preparation for molding, the first particulate material can be mixed with various additives such as sintering aids, binders, dispersants, dispersion media, etc. as is well known to those skilled in the art. A particularly preferred formulation comprises a first particulate material comprising silicon nitride such as the above-described raw product powder in the amount of about 50–75 weight percent, a binder such as poly(2-ethyl-2-oxazoline) in the amount of about 10–25 weight percent, a dispersant such as polyethylene glycol in the amount of about 1–5 weight percent, a dispersion medium such as isopropyl alcohol in the amount of about 10–25 weight percent, and a sintering aid such as a combination of yttria and alumina in the amount of about 1–10 weight percent. Such components are thoroughly mixed by milling, and the resulting mixture is then molded by preferably first platen pressing and then isostatic pressing.

Each of outer layers 36 and 38 comprise, and preferably consist essentially of, the second particulate material which comprises at least about 90 weight percent carbon. Such second particulate material is most preferably carbon black which preferably comprises at least about 95 weight percent carbon and less than about 0.5 weight percent ash, and most preferably at least about 98 weight percent carbon and less than about 0.2 weight percent ash. Such carbon black is also preferably characterized by a BET surface area of at least about 1 $m^2/g$, most preferably about 5 $m^2/g$. As used herein and in the appended claims, the term "carbon black" is defined as the solid particulate product resulting from the decomposition of hydrocarbons in the vapor phase.

Inner layer 40 comprises, and preferably consists essentially of, the third particulate material which comprises a ceramic compound selected from the group consisting of a nitride, a carbide, and mixtures thereof. As used herein and in the appended claims, "carbides" and "nitrides" are defined as binary compounds of carbon (in carbides) or nitrogen (in nitrides) and another element. Such other element can be a transition metal selected from Groups IIIA, IVA, VA, VIA, VIIA, VIIIA, or IB of the Periodic Table of the Elements (IUPAC version), or such other element can be selected from boron, silicon, or aluminum. Suitable ceramic compounds include, but are not limited to, silicon nitride, aluminum nitride, boron nitride, silicon carbide, zirconium carbide, titanium carbide, and tungsten carbide. The preferred ceramic compound is a nitride, most preferably silicon nitride. The third particulate material as comprising silicon nitride preferably comprises less than about 5 weight percent oxygen and less than about 5 weight percent carbon, most preferably less than about 3 weight percent oxygen and less than about 1 weight percent carbon, and is preferably further characterized by a BET surface area of at least about 1 $m^2/g$ and most preferably at least about 5 $m^2/g$, It is also preferred that the third particulate material as comprising silicon nitride contains less than about 1,000 ppm of elemental impurities such as chlorine, iron, calcium, and aluminum, and most preferably less than about 500 ppm of such elemental impurities.

In preparation for sintering of article 34, heating chamber 16 is purged of any oxygen therein by a number of evacuation/purge cycles wherein heating chamber 16 is evacuated through outlet conduit 20, followed by a flow of a generally nonoxidizing gas into the heating chamber 16 through inlet conduit 18. The nonoxidizing gas which provides a generally nonoxidizing atmosphere in heating chamber 16 is preferably selected from the group consisting of nitrogen, argon, and mixtures thereof. Such gas most preferably consists essentially of nitrogen.

At the end of the above-described evacuation/purge cycles, heating chamber 16 is pressured with the nonoxidizing gas to a predetermined desired pressure, preferably less than about 200 psig, more preferably less than about 50 psig, and most preferably about 0 psig to about 15 psig. A continuous flow of the nonoxidizing gas is now commenced through heating chamber 16 from inlet conduit 18 to outlet conduit 20 while substantially maintaining the above-mentioned predetermined pressure in heating chamber 16. Such a condition of continuous flow through the heating chamber while maintaining the predetermined pressure can be accomplished by, for example, use of a volumetric flow meter and associated adjustable valve (not shown) in conjunction with inlet conduit 18 and also outlet conduit 20. The volumetric flow rate through inlet conduit 18 can be regulated to be substantially equivalent to the volumetric flow rate through outlet conduit 20 so as to maintain a substantially constant pressure in heating chamber 16. Such flow of gas while maintaining the predetermined pressure in heating chamber 16 is continued throughout the subsequently described heating procedure. The flow rate of gas through heating chamber 16 is not particularly critical, but is typically in the range of about 0.1 to about 10 SCFH.

After the desired flow rate and pressure conditions are established as described above, the heating procedure is commenced. Heating chamber 16 and crucible 26 therein are gradually heated to a maximum temperature of preferably about 1500° C. to about 1900° C. over a period of about 1 to about 3 hours. After reaching such maximum temperature, the furnace can be turned off immediately to be allowed to cool, or such maximum temperature can first be held for a period of preferably not more than about 15 minutes and most preferably not more than about 5 minutes. In any event, it is preferred that the temperature is in the range of about 1500° C. to about 1900° C. for a time of about 15 minutes to about 2 hours.

After heating chamber 16 and crucible 26 have cooled to about room temperature, the flow of gas through heating chamber 16 is terminated, the heating chamber 16 is depressurized to atmospheric pressure (if operated above atmospheric pressure), and crucible 26 is removed from heating chamber 16.

Sintering of an article comprising silicon nitride in accordance with the invention is particularly effective at producing a highly dense (i.e. at least about 90 percent theoretical density) sintered article by employing relatively low pressures during sintering of less than 200 psig and as low as atmospheric pressure.

It is to be understood that the above description pertains to a preferred embodiment of the invention, but that many variations and modifications are within the scope of certain aspects of the invention. For example, a single, continuous outer layer of second particulate material completely surrounding the article could be employed instead of the two separate outer layers employed in the illustrated embodiment. According to other broad aspects of the invention, the above-described raw product powder, which is disclosed as particularly useful as the first particulate material, could also be used as the third particulate material.

EXAMPLES

Examples will now be described to further illustrate the invention, but which should not be construed to limit the invention in any manner.

Each of the following examples employed a particulate material as produced by a modified version of the reactor shown in FIGS. 5–7 of U.S. Pat. No. 5,178,844, supra. Such particulate material is called "raw product powder" in U.S. Pat. No. 5,178,844, and will hereafter be referred to as "raw product powder". As will be discussed further below in each individual example, samples of such raw product powder comprising silicon nitride were employed to mold articles (specifically, discs) therefrom, which were then sintered to a final sintered article.

The reactor used to produce the raw product powder included a chamber having upstream and downstream ends, a single combustion nozzle having an outlet at the upstream end of the chamber and on the longitudinal axis of the chamber (unlike the reactor of the above-mentioned FIGS. 5–7 which has three combustion nozzles oriented around the axis), and a reactant nozzle radially extending into the chamber and having an outlet on the longitudinal axis of the chamber. The combustion nozzle injects a mixture of fuel and oxidant into the chamber, and the reactant nozzle injects reactants into the chamber. The chamber is considered to have two "zones": a "combustion zone" which extends from the upstream end of the chamber to a boundary between the zones at the reactant nozzle outlet, and a "reaction zone" which extends from the boundary to the downstream end of the chamber. A quartz conduit was provided having one end in communication with the downstream end of the reactor and the other end in communication with two heat exchangers. Each heat exchanger included concentric quartz tubes defining an annulus therebetween through which coolant fluid was circulated to cool raw product powder flowing through the interior of the inner tube A Dacron ® polyester bag filter at the outlet of each heat exchanger collected the thus cooled raw product powder.

Important reactor dimensions were as follows: diameter of chamber—5.08 cm; overall length of chamber—50.8 cm; length of combustion zone—22.9 cm; length of reaction zone—27.9 cm; I.D. of combustion nozzle—0.343 cm; and I.D. of reactant nozzle—0.356 cm.

The raw product powder was produced as follows using the above-described reactor. The mixture of fuel and oxidant as injected through the combustion nozzle included ethylene at a flow rate of 0.903 gmol/min, acetylene at a flow rate of 0.223 gmol/min, and oxygen at a flow rate of 1.12 gmol/min. Reactants as injected through the reactant nozzle included silane at a flow rate of 0.06 gmol/min and ammonia at a flow rate of 0.16 gmol/min. The notation "gmol/min" means gram moles/minute. Actual measurements of flow rate were taken volumetrically at room temperature and atmospheric pressure in liters/minute. These volumetric measurements were converted to gmol/min by assuming there are 24.45 liters/minute for any gas at 25° C. (room temperature) and atmospheric pressure. The reactor was operated with these conditions for a total of 210 minutes to yield 483 grams of raw product powder as obtained from the bag filters and from the interior walls of the heat exchangers.

Analysis of the raw product powder revealed 57.7 wt. % silicon, 11.8 wt. % oxygen, 5.22 wt. % carbon, 0.14 wt. % hydrogen, and 27.92 wt. % nitrogen. The carbon, nitrogen, and hydrogen weight percentages were obtained by CHNS combustion analysis, the silicon weight percentage by X-ray fluorescence analysis and the oxygen weight percentage by neutron activation analysis. Such weight percentage results have not been normalized to 100%. Variance from 100% is attributable to normal analysis inaccuracies. The substantial weight percentages of silicon and nitrogen in the raw product powder are taken to indicate the presence of silicon nitride. Considering other possible bonding of nitrogen to other elements, nitrogen in combination with such other elements in the powder will generally not form solid compounds. Therefore, it is reasonable to assume that the nitrogen present in the solid product is bound to at least a portion of the silicon.

Each of the following examples also employed discs in their respective sintering operations which were fabricated as follows. A binder concentrate was first prepared by mixing 20 grams poly(2-ethyl-2-oxazoline) (XUS40303.00 ceramic binder, Dow Chemical U.S.A. of Midland, Mich.), 7 grams poly(ethylene glycol) (avg. M. W. 400, Aldrich Chemical Company, Inc. of Milwaukee, Wis.), and 31.2 grams isopropyl alcohol (electronic grade, Fisher Scientific of Pittsburg, Pa.) with a Dispersator mill (Premier Mill Corp. of Temple, Pa.). 1.25 grams of the binder concentrate was then added to 900 mL acetone along with 5.55 grams yttria (99.999% purity, Rare Earth Products, Johnson Matthey of Seabrook, N.H.) and 6.14 grams alumina (Bakalox CR30, Bdaikowski International of Charlotte, N.C.). The resulting mixture was milled for 15 minutes with burundum cylinders in a polyethylene jar. 100 grams of the silicon nitride-containing raw product powder was then added to the mixture and milling was continued for 64 hours, followed with drying by removal of excess acetone with a Rotovapor (Buchi Laboratiums Technik AG of Switzerland). Individual samples comprising about 7 grams of the thus milled and dried mixture were platen pressed at 2500 psig into a number of discs having respective diameters of about 1.75 inch and thicknesses slightly in excess of 0.1 inch.

Example I (Invention)

The purpose of this example is to demonstrate sintering in accordance with the invention.

Equipment used in this example included a graphite crucible and a commercially available furnace modified to permit continuous gas flow therethrough. The crucible had walls $\frac{1}{4}$ inch thick which defined a 3 in.$\times 2\frac{1}{2}$ in.$\times \frac{3}{4}$ in. chamber therein, and a loose fitting lid that sets upon the top of the crucible. The furnace was a Model 1000 furnace from Thermal Technology Inc. of Santa Rosa, Calif., having a graphite electrode and graphite lined heating chamber and modified to include flow meters and adjustable valves to regulate a continuous gas flow through the heating chamber while maintaining a constant pressure therein.

In each of the runs of this example, a single disc was positioned within the crucible between layers of commercial silicon nitride powder (SN-E10 powder, Ube Industries, Ltd. of Tokyo, Japan) and carbon black (Arosperse 15, J. M. Huber Corp. of Borger, Tex.) in accordance with the invention and as is detailed further below. The silicon nitride powder is characterized by the following characteristics, as provided by the manufacturer, which make it especially suitable for the invention: a composition comprising >38.0 wt. % nitrogen, <2.0 wt. % oxygen, <0.2 wt. % carbon, <100 ppm chlorine, <100 ppm iron, <50 ppm calcium, and <50 ppm aluminum; a particle size of about 0.2 micron; a BET surface area of about 10-12 m$^2$/g; and 100% crystallinity with >95% alpha phase and <5% beta phase. The carbon black is characterized by the following, as also provided by the manufacturer, which also makes it particularly suitable for the invention: 99.35 wt. % carbon; 0.09 wt. % ash; 0.45 wt. % hydrogen; 0.26 wt. % sulphur; 0.16 wt. % volatiles; a particle size of 320 nm; and a BET surface area of 8.2 m$^2$/g.

In packing the crucible in each run, a 0.25 inch thick layer of carbon black was first placed at the bottom of the crucible, followed by addition of silicon nitride powder until the crucible was about 50% full. The disc was pressed Into this silicon nitride powder and then covered with more silicon nitride powder. The carbon black and silicon nitride powder were settled by gentle tapping of the crucible, and the disc completely covered with more silicon nitride powder and then a final layer of carbon black. Finally, the lid was set in place. It should be noted that after each run, fresh carbon black and silicon nitride powder were used to repack the crucible.

To sinter a disc in each run, the crucible as packed with carbon black, silicon nitride powder and the disc was placed in the heating chamber of the above-described furnace, and the furnace was then sealed. The heating chamber was evacuated and filled with nitrogen, and again evacuated and filled with nitrogen to a predetermined pressure. A continuous flow of nitrogen was then commenced through the heating chamber at a measured flow rate of about 1.0 SCFH (flow meter calibrated for air) so that the predetermined pressure, indicated in Table I, was maintained while such nitrogen flowed through the chamber and throughout the sintering procedure which follows: heat to about 200° C. at a rate of about 20° C./minute over a period of about 10 minutes; heat to about 1200° C. at a rate of about 100° C./minute over a period of about 10 minutes; heat to about 1882° C. at a rate of about 8° C./minute over a period of about 86 minutes; turn off furnace heater and cool to room temperature over a period of between 30 and 60 minutes. This sintering procedure resulted in heating of the disc for about 1 hour within the sintering temperature range of 1500° C.–1900° C.

Table I summarizes the pressures employed in Runs 1–4 as well as the density of the sintered disc. It should be noted that in Run 4, the sintered disc was subjected to a subsequent heating operation in a tube furnace at about 1200° C. and under a sweep of nitrogen for about 2 hours. This subsequent heating operation was carried out to ensure that all of the binder was burned off of the disk so as to maximize density. The density for the sintered disc from Run 4 as indicated in Table I was measured after the above-described heating operation at 1200° C. Densities were determined using ASTM C 373-72, which is a water buoyancy test.

TABLE I

| Run | Pressure (psig) | Density (% TD$^a$) |
|---|---|---|
| 1 | 10 | 91.5 |
| 2 | <2 | 90.9 |
| 3 | 10 | 91.1 |
| 4 | 10 | 92.3 |

$^a$TD means theoretical density of pure crystalline silicon nitride which is assumed to be 3.15 g/cc.

The results of Table I illustrate that high density (greater than 90% TD) sintered articles comprising silicon nitride can be produced in accordance with the invention at very low pressures of 10 psig or less. Moreover, it can be seen from Table I that sintering at a very low pressure of less than 2 psig does not substantially affect the density of the resulting sintered article, as compared to the densities obtained at the higher pressure of 10 psig. Finally, Run 4, employing the additional heating step at 1200° C., can be seen from Table I to have little beneficial effect on the density of the sintered article, thus making such additional heating unnecessary.

Example II (Comparative)

The purpose of this example is to demonstrate sintering in silicon nitride powder alone and in carbon black alone, in order to compare the resulting sintered densities to those obtained in Example I in accordance with the invention.

The crucible employed in this example was also graphite but of a different design than that employed in Example I. This crucible included a square shaped outer section and a square shaped inner section which defined a chamber therebetween. The walls of such sections were $\frac{1}{8}$ inch thick. The chamber defined in the crucible was adapted to receive four graphite dividers so as to divide the chamber into four rectangular shaped 2 9/16 in.$\times$1 1/2 in.$\times$13/16 in. subchambers. A loose fitting lid was provided to set on top of the crucible.

Two of the subchambers (hereafter denoted as subchambers 1 and 2) were about 50% filled with carbon black and the other two subchambers (hereafter denoted as subchambers 3 and 4) were about 50% filled with silicon nitride powder. The same commercial carbon black and silicon nitride powders used in Example I were used in this example. A disc was then pressed into the powders in each of the four subchambers, followed by filling of subchambers 1 and 2 with carbon black and filling of subchambers 3 and 4 with silicon nitride powder. The crucible was gently tapped to settle the powders and the lid set in place.

Sintering of each of the four discs in the crucible was carried out employing the same furnace and substantially the same conditions (at 10 psig) as employed in Example I. Densities of the resulting sintered discs were determined as in Example I, and such density results are set forth in Table II, where Runs 5-8 correspond to disks sintered in subchambers 1-4, respectively.

TABLE II

| Run[a] | Density (% TD[b]) |
|---|---|
| 5 (carbon black) | 62.2 |
| 6 (carbon black) | 51.1 |
| 7 (silicon nitride) | 72.9 |
| 8 (silicon nitride) | 70.8 |

[a]Runs 5-8 were carried out simultaneously in the same crucible as described above. Packing material is indicated in parentheses.
[b]TD means theoretical density of pure crystalline silicon nitride which is assumed to be 3.15 g/cc.

It can be seen from Table II that the densities obtained with only silicon nitride or only carbon black are significantly lower than densities obtained in accordance with the invention in Example I (see Table I) employing a silicon nitride layer surrounding and in contact with the disc and also carbon black layers not in contact with the disc.

That which is claimed is:

1. A method comprising:
   (a) providing an article molded from a first particulate material comprising silicon nitride;
   (b) providing at least one outer layer which is closely adjacent to but not contacting said article and which comprises a second particulate material comprising at least about 90 weight percent carbon;
   (c) providing at least one inner layer which at least partially surrounds said article so as to be intermediate to said article and said at least one outer layer and which comprises a third particulate material comprising a ceramic compound selected from the group consisting of a nitride, a carbide, and mixtures thereof; and
   (d) heating said article as positioned with respect to said at least one outer and inner layers in steps (b) and (c) so as to sinter said article.

2. A method as recited in claim 1 wherein said first particulate material further comprises silicon in addition to that in the silicon nitride, carbon, and oxygen, and is characterized by the following weight-percentages: silicon in the amount of about 40 to about 75 weight percent; nitrogen in the amount of about 10 to about 40 weight percent; carbon in the amount of about 1 to about 10 weight percent; and oxygen in the amount of about 1 to about 30 weight percent.

3. A method as recited in claim 1 wherein said at least one outer layer consists essentially of said second particulate material.

4. A method as recited in claim 3 wherein said second particulate material is carbon black.

5. A method as recited in claim 4 wherein said carbon black comprises at least about 95 weight percent carbon and less than about 0.5 weight percent ash, and has a BET surface area of at least about 1 m$^2$/g.

6. A method as recited in claim 5 wherein said carbon black comprises at least 98 weight percent carbon and less than about 0.2 weight percent ash, and has a BET surface area of at least about 5 m$^2$/g.

7. A method as recited in claim 1 wherein said at least one inner layer consists essentially of said third particulate material.

8. A method as recited in claim 7 wherein said third particulate material comprises a nitride.

9. A method as recited in claim 8 wherein said nitride is silicon nitride.

10. A method as recited in claim 9 wherein said third particulate material comprises less than about 5 weight percent oxygen and less than about 5 weight percent carbon, and has a BET surface area of at least about 1 m$^2$/g.

11. A method as recited in claim 10 wherein said third particulate material comprises less than about 3 weight percent oxygen and less than about 1 weight percent carbon, and has a BET surface area of at least about 5 m$^2$/g.

12. A method as recited in claim 1 wherein said at least one inner layer has at least one inner boundary in contact with said article and also has at least one outer boundary, and wherein said at least one outer layer has at least one inner boundary in contact with said at least one outer boundary of said at least one inner layer.

13. A method as recited in claim 12 wherein of the total volume of said at least one inner and outer layers, said at least one inner layer comprises about 10 to about 90 volume percent and said at least one outer layer comprises about 10 to about 90 volume percent.

14. A method as recited in claim 13 wherein the ratio of the volume of said at least one inner layer to the volume of said article and also the ratio of the volume of said at least one outer layer to the volume of said article is about 1:1 to about 100:1.

15. A method as recited in claim 14 wherein each of said ratios is about 5:1 to about 50:1.

16. A method as recited in claim 15 wherein said at least one inner layer comprises a single inner layer which completely surrounds said article.

17. A method as recited in claim 1 wherein step (d) is carried out at a pressure of less than about 200 psig.

18. A method as recited in claim 17 wherein step (d) is carried out at a pressure of less than about 50 psig.

19. A method as recited in claim 18 wherein step (d) is carried out at a pressure of about 0 psig to about 15 psig.

20. A method as recited in claim 17 wherein step (d) is carried out in a generally nonoxidizing atmosphere.

21. A method as recited in claim 20 wherein said nonoxidizing atmosphere comprises a gas selected from the group consisting of nitrogen, argon, and mixtures thereof.

22. A method as recited in claim 21 wherein step (d) is carried out in a furnace chamber having an inlet and an outlet and wherein said gas continuously flows through said furnace chamber from the inlet to the outlet during step (d) while substantially maintaining said pressure in said furnace chamber.

23. A method as recited in claim 17 wherein step (d) is carried out at a temperature of about 1500° C. to about 1900° C.

24. A method as recited in claim 23 wherein heating in step (d) at said temperature of about 1500° C. to about 1900° C. is carried out for a time of about 15 minutes to about 2 hours.

25. A method as recited in claim 1 further comprising the steps before step (a) of mixing said first particulate material with a sintering aid comprising a combination of yttria and alumina to thereby produce a mixture and then molding said mixture to produce said article.

* * * * *